United States Patent
Senge et al.

(10) Patent No.: US 11,926,747 B2
(45) Date of Patent: Mar. 12, 2024

(54) UV CURABLE AND HEAT SEALABLE INK

(71) Applicant: HID Global CID SAS, Suresnes (FR)

(72) Inventors: Carsten Senge, Bad Zwischenahn Bloh (DE); Samantha Nelwan, Noisy-le-grand (FR)

(73) Assignee: HID Global CID SAS, Suresnes (FR)

( * ) Notice: Subject to any disclaimer, the term of this patent is extended or adjusted under 35 U.S.C. 154(b) by 122 days.

(21) Appl. No.: 17/757,866

(22) PCT Filed: Dec. 21, 2020

(86) PCT No.: PCT/EP2020/087415
§ 371 (c)(1),
(2) Date: Jun. 22, 2022

(87) PCT Pub. No.: WO2021/130156
PCT Pub. Date: Jul. 1, 2021

(65) Prior Publication Data
US 2023/0028834 A1    Jan. 26, 2023

(30) Foreign Application Priority Data

Dec. 23, 2019 (EP) ..................................... 19219460

(51) Int. Cl.
| | | |
|---|---|---|
| *C09D 11/101* | (2014.01) | |
| *B41M 1/12* | (2006.01) | |
| *B41M 3/14* | (2006.01) | |
| *B42D 25/351* | (2014.01) | |
| *B42D 25/373* | (2014.01) | |
| *B42D 25/387* | (2014.01) | |
| *C09D 11/037* | (2014.01) | |
| *C09D 11/50* | (2014.01) | |

(52) U.S. Cl.
CPC ............. *C09D 11/101* (2013.01); *B41M 1/12* (2013.01); *B41M 3/14* (2013.01); *B42D 25/351* (2014.10); *B42D 25/373* (2014.10); *B42D 25/387* (2014.10); *C09D 11/037* (2013.01); *C09D 11/50* (2013.01)

(58) Field of Classification Search
CPC ...... B41J 2/2107; C09D 11/101; C09D 11/30; C09D 11/037; C09D 11/54; C09D 11/322; B41M 1/12; B41M 5/0047; B42D 25/373; B42D 25/387
See application file for complete search history.

(56) References Cited

U.S. PATENT DOCUMENTS

| | | | | |
|---|---|---|---|---|
| 8,303,700 B1* | 11/2012 | Degott | .................... | B05D 5/06 |
| | | | | 106/31.6 |
| 2018/0065394 A1* | 3/2018 | Tsutsui | .................. | B41M 5/502 |
| 2018/0320015 A1 | 11/2018 | Kecht et al. | | |

FOREIGN PATENT DOCUMENTS

| | | |
|---|---|---|
| CN | 101557945 | 10/2009 |
| CN | 106117586 | 11/2016 |
| EP | 1854852 A1 | 11/2007 |
| EP | 3079916 A1 | 10/2016 |
| EP | 3285942 A1 | 2/2018 |
| EP | 3392320 A1 | 10/2018 |
| JP | 2001011395 | 1/2001 |
| WO | WO-2015083099 A1 | 6/2015 |
| WO | 2015129346 | 9/2015 |
| WO | WO-2021130156 A1 | 7/2021 |

OTHER PUBLICATIONS

"European Application Serial No. 19219460.3, Extended European Search Report dated Jul. 31, 2020", 9 pgs.
"International Application Serial No. PCT/EP2020/087415, International Search Report dated Apr. 14, 2021", 6 pgs.
"International Application Serial No. PCT/EP2020/087415, Written Opinion dated Apr. 14, 2021", 7 pgs.
"Chinese Application Serial No. 202080089602.2, Office Action dated Nov. 27, 2023", with English Translation, 19 pages.

* cited by examiner

*Primary Examiner* — Jannelle M Lebron
(74) *Attorney, Agent, or Firm* — Schwegman Lundberg & Woessner, P.A.

(57) ABSTRACT

Disclosed is an ink comprising a transparent matrix being UV curable and heat scalable, and at least one pigment component. The ink in its UV-cured state has a peel strength in the range of about 6 to 8 N/cm, wherein this adhesiveness is achievable by means of a further lamination step under the influence of pressure and heat so that the ink acts as a hot glue. Further disclosed is a safety structure comprising a semitransparent layer being formed at least partially by the UV-cured ink, and a secure article comprising the safety structure. Further disclosed is a use of the ink for silkscreen printing.

20 Claims, No Drawings

UV CURABLE AND HEAT SEALABLE INK

CROSS-REFERENCE TO RELATED APPLICATION(S)

This application is a national stage application under 35 U.S.C. § 371 of PCT Appl. No. PCT/EP2020/087415, titled "UV Curable and Heat Sealable Ink," filed Dec. 21, 2020, which claims priority to EP Pat. Apps. No. 19219460.3 titled "UV Curable and Heat Sealable Ink," filed Dec. 23, 2019, each of which is hereby incorporated by reference herein in its entirety.

TECHNICAL FIELD

The present disclosure generally relates to an ink comprising a transparent matrix being UV curable and heat sealable, and at least one pigment component.

BACKGROUND

To secure a document, it is known to use so-called "first level" security elements that are detectable with the naked eye in visible light and without the use of a particular device. Alternatively or additionally security elements known as "second level" elements are detectable only with a relatively simple device such as a lamp emitting in the ultraviolet or infrared wave range. It may also be desirable to use so-called "third level" security elements capable of generating a specific signal when subjected to optoelectronic, electrical, magnetic or electromagnetic excitation.

There is a need to benefit from security structures that are easily identifiable with the naked eye, and constitute first or second level security.

It has been proposed to use goniochromatic pigments on security documents, in order to bring about a change of color effect in reflected light, when the viewing angle changes.

There are relatively transparent pigments having a platelet substrate core coated with thin films producing interfering color.

U.S. Pat. No. 6,686,042 A1 discloses opaque pigments, which may include a metal core.

EP 227,423 A1 discloses an optically variable ink having a goniochromatic platelet pigment.

US 2013/0189 454 A1 discloses a layer having platelet pigments magnetically aligned to create a dynamic effect with respect to a printed background. This publication does not describe any optical effects that would be obtained in transmission.

U.S. Pat. No. 6,491,324 B1 discloses a semitransparent masking layer for security thread. This layer can be obtained using optically variable interference pigments.

US 2011/0226147 A1 describes a structure comprising at least two transparent layers each comprising an interference pigment. This document discloses pigments formed of metal oxides.

FR 2 849 657 A1 teaches a sheet comprising on the surface a layer formed of iridescent pigments.

It is known to mix these pigments into clear lacquers based on water or organic solvents in order to obtain inks containing the pigments which can be used for silkscreen printing.

Since the water based and organic solvent based clear lacquers easily evaporate and can be only used for a limited time with the equipment for silkscreen printing, therefore, a further variant is directed to clear lacquers on the base of polymers being UV curable.

However, these UV curable clear lacquers show the drawback of a low adhesiveness on the further applied lamination foil and provide a peel strength being distinctly lower, for example below 3.5 N/cm, as demanded by the ISO standard 7810. Lacquers on the base of water or organic solvents are not usable on all, in particular modern apparatuses and equipment for silkscreen printing since due to evaporating effects and thickening of the lacquers the used printing apparatuses will be clogged.

EP 1 854 852 A1 describes a coating composition for producing magnetically induced images.

EP 3 285 942 A1 teaches a process for the preparation of metallic nano-particle layers and their use for decorative or security elements.

In EP 3 392 320 A1 a composition for anti-counterfeit ink, an anti-counterfeit ink, a printed article for counterfeit prevention, and a method of producing composition for anti-counterfeit ink is disclosed.

WO 2015/083099 A1 describes a security structure comprising a semi-transparent layer containing a binder and at least goniochromatic metal particles inside the binder in a concentration providing the layer with the semi-transparency thereof.

EP 3 079 916 A1 discloses optically variable security threads and stripes.

US 2018/0320015 A1 describes a security pigment, a luminescent polymer resin and a method for producing same.

The present disclosure is directed, at least in part, to improving or overcoming one or more aspects of prior systems.

SUMMARY OF THE DISCLOSURE

According to one aspect of the present disclosure, an ink comprises a transparent matrix being UV curable and heat sealable, and at least one pigment component. The ink in its UV-cured state has a peel strength in the range of about 6 to 8 N/cm as demanded by the ISO standard 7810. This adhesiveness is achievable by means of a further lamination step under the influence of pressure and heat so that the ink acts as a hot glue.

In a further aspect, the present disclosure relates to a safety structure comprising a semitransparent layer being formed at least partially by the UV-cured ink according to the above aspect. The adhesiveness is achieved by means of a further lamination step under the influence of pressure and heat so that the ink acts as a hot glue.

In an additional aspect, the present disclosure relates to a secure article comprising a structure according to the above aspect, in particular a security element or a secure document such as for example a passport, an identity card, a driving license, an interactive playing or collectible card, a means of payment, in particular a payment card, a bank note, a voucher, a secure label, a transport card, a loyalty card, a card of delivery, a subscription card or a specific means of payment, such as a token or a wafer, in particular used in casinos.

In another aspect, the present disclosure relates to the use of the ink of the above aspect for silkscreen printing, in particular on surfaces of polymeric materials.

Due to the present disclosure the handling and processability of an ink system may be improved, in particular if used for silkscreen printing. The adhesiveness of the printed structure on the support and also with respect to the laminated cover sheet, in particular in a multilayered card structure, under the retention of the optical properties of the ink system, might be improved.

Other features and aspects of this disclosure will be apparent from the following detailed description.

DETAILED DESCRIPTION

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

Particles

The particles of the pigment component having preferably a hydrophobic properties can be mixed homogenously into the transparent matrix resulting in an appropriate viscosity of the mixture which is suitable for silkscreen printing.

As further advantages the silkscreen printing and the hardening of the ink occur effectively.

In combination with multilayered products, like safety structures and security articles, the printed element can exhibit a high adhesiveness which is significantly above the requirements according to the ISO standard 7810.

The quality of the optical appearance of the printing is comparable with printings using water based inks. The personalization result can be adjusted via appropriate laser parameters.

The ink according to the present disclosure can be used with existing equipment for silkscreen printing of UV curable inks.

It is not necessary to moisture the printing environment as in the variant with water based inks. There is also no emission of harmful organic solvents due to their evaporation. Further, the ink according to the present disclosure is not a dangerous good so that it is transportable without any safety restrictions.

It is possible to interrupt the printing process for a limited time since there is no pre-drying and thickening of the ink. The curing process of the ink is based solely on UV curing.

The ink according to the present disclosure has a quite high pot life of about half a year.

Due to the heat sealable capability of the new ink, a high peel strength in the range of about 6 to 8 N/cm is obtained. This high adhesiveness can be achieved by means of a further lamination step under the influence of pressure and heat so that the ink according to the present disclosure can act as a hot glue.

The matrix of the ink according to the present disclosure is preferably curable in a UV wavelength window of 320 to 420 nm. This photon energy allows a rapid and efficient curing of the matrix material using conventional UV light sources, like mercury vapor lamps or LED systems. By using UV blocker substances absorbing specific UV wavelengths being present in the matrix unfortunate coloring effects can be reduced. The coloring effect appears by light exposure after curing and card manufacturing in the real card's life.

Advantageously, the matrix is curable by a UV radiation energy density of 200 to 400 $mJ/cm^2$, more preferred between 200 to 300 $mJ/cm^2$, most preferred 250 $mJ/cm^2$. This radiation density results from the power of the UV light source and the passing velocity of the object to be cured through the drying tunnel of the UV curing equipment. The preferable UV radiation energy density will essentially depend on the UV absorbance of the used polymer system for the matrix and the desired mechanical properties of the cured matrix. For example, the hardness and resistivity will increase with increasing UV radiation energy density.

In a preferred embodiment of the ink according to the present disclosure, the matrix comprises polyurethane or acrylate polymers or mixtures thereof. These polymer systems exhibit good UV curing properties, can be produced under relatively low costs, and in particular polyurethanes are assumed to be responsible for the heat sealable effect. By varying the molecular masses and/or mixing ratios between the different polymer components, the properties of the matrix can be further adjusted.

A preferred composition of the matrix comprises 25-50% of 4-hydroxy-butylacrylate, 10-25% of urethane acrylate oligomer, 10-25% of 2-(2-ethoxyethoxy)ethylacrylate, 2.5-10% of 2-hydroxy-2-methylpropiophenone, 2.5-10% of ethyl-(2,4,6-trimethylbenzoyl)phenylphosphinate and 1-2.5% of ethoxylated dipentaerythritol hexaacrylate. Minor components are less than 1% of phenyl-bis(2,4,6-trimethylbenzoyl)-phosphinoxide, less than 0.5% of 4,4-(1-methylethyliden)bis-phenol and less than 0.5% of glycerolpropoxytriacrylate. This kind of a matrix composition is commercially available.

Preferably, the pigment component of the ink according to the present disclosure comprises goniochromatic metal particles in order to bring about a change of colour effect in reflected light, when the viewing angle changes. This goniochromatic effect is easily identifiable with the naked eye, and constitutes a first or second level security.

The particles of the pigment component used inherently have advantageously an opaque character which might enhance the color change perception effect, without requiring the presence of a metallic or black reflective background.

The particles are preferably platelet-shaped. They may have opposite main faces which are substantially flat and parallel, for example with a deflection angle of one relative to the other of less than 15°. The particles may be elongate along a longitudinal axis, and their length L may be significantly greater than their thickness e, measured between said main faces, the form factor L/e being preferably greater than or equal to 2, more preferably 20, even more preferably 1000 or even 2000. Preferably, L/e is between 20 and 100.

The particles preferably comprise a metal core, which makes it possible to obtain a metallic reflective effect. The fact of having a metal core makes it possible in addition to being able to carry out transformations such as chemical de-metallization or phase modification by means of a laser in order to personalize the layer. To allow a chemical de-metallization, contrary to U.S. Pat. No. 6,521,036, it is preferable not to use metals or anti-corrosion alloys to form the core.

The metals used to make the core may be selected from aluminum, copper, zinc, iron, titanium, chromium, silver, gold, nickel and their alloys. Examples of pigments that may be suitable as particles of the pigment component are described in U.S. Pat. No. 6,686,042 B1.

The thickness of the metal core layer may be greater than or equal to 100 angstroms.

Preferably, the core of the particles of the pigment component is aluminum.

The average particle size is preferably between 10 and 50 microns so that the particles of the pigment component can be used with the main known means for printing and coating. Most preferred is an average particle size of 20 microns.

The nature of the particles is preferably capable of giving the semitransparent layer a mirror effect in reflection. In other words, specular reflection can take place.

Advantageously, the nature of the particles is capable of not conferring on the semi-transparent transmission coloring layer.

The nature of the particles preferably imparts a darkening in transmission of the colors which are visible in reflection from the back.

Thus, the semi-transparent layer may have in transmission a gray (achromatic) character resulting from the metallic material of said particles.

The particles are preferably not iridescent particles that reflect part of the incident light and let part of the incident light, such as so that the color of the transmitted light is complementary to the color of the reflected light.

On the contrary, the particles of the pigment component used are metallic particles which may act as mirrors by reflecting the incident light. They do not let part of the incident light of complementary color to that which they reflect, contrary to the iridescent particles.

The color path and the color saturation when the viewing angle varies are preferably larger than for iridescent particles.

Safety Structure

The disclosure also relates to a safety structure comprising a semitransparent layer being formed at least partially by the ink.

The safety structure according to the disclosure may comprise at least one other security element superimposed at least partially, in particular completely, on the semitransparent layer, in particular a metallic, de-metallized, printed security element, a watermark or a marking obtained by a laser. This other security element can cover the semi-transparent layer or be masked by the semi-transparent layer when this is observed in reflection, in particular because of the reflection of light by the metal particles, and become observable only in transmitted light, because of the non-opaque nature of the semi-transparent layer and in particular of its colorless transparency in transmission.

The other security element can still be selected from the types of DOE (diffractive optical elements), security "see-through", micro-perforations, multicolor fluorescence, this list is not limiting. When the other security element has a pattern formed by metallization/de-metallization, it can be Cleartext @ or a halftone image conferring a relief impression.

The safety structure may comprise a substrate, in particular a transparent thermoplastic film. The other security element may be located on the same side as the semi-transparent layer relative to the substrate or be located on the opposite side to the semi-transparent layer relative to the substrate.

The goniochromatic effect provides additional first level security.

The safety structure may comprise two semitransparent layers arranged for example on the front and back of a monolayer or multilayer substrate. The safety structure may comprise another security element disposed between the two semitransparent layers. These can be formed with the same particles or with different particles. The particle concentrations of the two layers may be equal or different.

The semi-transparency can be obtained by a metallic deposit, such as aluminum, whose adjustment of the optical density, that is to say the adjustment of the amount of deposited metal, makes it possible to modulate the transmittance. The optical density is advantageously chosen between 0.2 and 1.6, preferably between 0.4 and 1.

The semi-transparent layer can make it possible to obtain a goniochromatic effect in reflection and a substantially colorless transparency in transmission.

The matrix may comprise any transparent substance allowing a good dispersion and holding of the particles, in particular a solution of polyurethane or acrylate polymers or mixtures thereof.

The particles of the pigment component used are preferably oriented substantially flat within the matrix. The orientation of the particles can be effected under the effect of forces exerted during the application, for example during printing or during the coating, because of the dynamic phenomena involved.

The particles of the pigment component are preferably dispersed substantially uniformly within the matrix.

The thickness of the semi-transparent layer is preferably between 2 and 50 microns, more preferably between 5 and 15 microns. Preferably, the thickness of the semitransparent layer is less than or equal to 15 microns since this makes it easier to obtain a monolayer of particles of the pigment component and thus particularly satisfactory metal reflection and semi-transparency aspects.

The particles are preferably present, within the matrix, in the form of a monolayer. Preferably, the particles of the pigment component are of such dimensions that they disperse substantially uniformly and substantially flat in the matrix.

For example, the particles have a mean mass size of between 10 and 50 microns, in particular of the order of 20 microns, and a thickness of between 0.5 and 5 microns, in particular of the order of 1 micron.

The size of the particles is preferably large enough to give them reduced mobility and to prevent them from dispersing with an orientation other than substantially flat.

The semi-transparent layer may comprise at least one dispersing and/or wetting agent, intended to promote a substantially homogeneous dispersion of the particles within the matrix, substantially flat.

The semi-transparent layer may comprise at least one wax-based additive, in particular in the solvent phase, intended to promote both non-sedimentation and non-flotation of the particles and therefore a substantially uniform dispersion thereof within the matrix.

The concentration by dry weight of said particles of the pigment component within the layer is preferably between 5 and 50%, relative to the total weight of the matrix and said particles, better between 15 and 45%. The volume occupied by the particles of the pigment component in the semi-transparent layer is preferably between 5 and 80%, better still between 20 and 50%, relative to the total volume of the layer.

The semi-transparent layer is for example made with 40% of particles of the pigment component in dry weight relative to the percentage of dry polyurethane matrix. The layer is applied in screen printing for example in the form of a thickness of 10 microns on the substrate.

In a variant, the concentration by dry weight of the particles of the pigment component is 30% and the substrate of the semi-transparent layer may be a filigree paper or a patterned wire formed by de-metallization.

The semi-transparent layer may have undergone a modification showing a pattern in reflected light. This pattern is advantageously formed by laser, which modifies the structure of the particles of the pigment component.

The semi-transparent layer may be carried by any type of substrate, and preferably a substrate comprising a surface of polymeric materials.

A single structure of particles may be used within the semi-transparent layer. Alternatively, a mixture of particles of the same structure but with different goniochromatic properties may be used, and in this case, the total particle content of the pigment component according to the disclosure is chosen so as to obtain the desired result.

Other compounds may be added to the layer, for example non-opaque pigments, fluorescent dyes, Stokes effect pigments, or with Anti-Stokes effect, among others, thus improving the security without unduly modifying the effects provided by the safety structure.

The substrate can be of any type.

It may in particular be made of a thermoplastic material, being preferably a film of polyvinylchloride (PVC) or polycarbonate (PC) or polyethylenterephthalate (PET) or polyethylene (PE) or polypropylene (PP) or polyethylencarbonate (PEC).

The substrate may have a monolayer or a multilayer structure. The layer may be deposited on the substrate by a printing technique, in particular silkscreen printing or Flexo printing or Intaglio printing, in the form of a continuous layer covering the entire surface of a face of the substrate or non-uniformly to reveal a pattern.

Preferably, the layer is continuous and covers the entire face of the substrate.

The layer can be customized by selectively modifying the structure of the particles of the pigment component within the layer, so as to locally change its optical properties.

Preferably, this modification is carried out by a laser, by modifying the crystalline phase of the metal of the particles of the pigment component to render it amorphous, and therefore more transparent. This conversion can be done with a Nd-YAG type laser which generates a punctually very high temperature causing a vitrification of the metal at the point of impact. As the laser moves, the metal returns to the ambient temperature of quasi-instantaneous way, to freeze the metal in the amorphous or partially amorphous state.

Secure Article

The disclosure also relates to a secure article comprising a safety structure, this secure article preferably being a security element or a secure document.

The safety structure may be in the form of a patch, safety thread or coating deposited on a paperboard substrate, synthetic paper, polymer, in particular of polyvinylchloride or polycarbonate, or paper-synthetic hybrid.

Preferably, the safety structure is superimposed on another security structure of the secure article, in particular an impression or a pattern formed by metallization or de-metallization, which is visible in light transmitted through the semi-transparent layer. This other security structure may also be a safety structure comprising a semi-transparent layer. In this case, the secure article may comprise, between the two semitransparent layers, one or more other security elements, for example a visible pattern in transmitted light, this pattern being for example formed by printing.

The safety structure can leave, for example after a laser or chemical modification of the particles of the pigment component of the semi-transparent layer, to appear a pattern formed within the semi-transparent layer when the secure article is observed at the naked eye in reflected light on one side, for example the front, this pattern being non-perceptible to the naked eye when the secure article is observed in transmitted light. The application of the laser or chemical modification to the semitransparent layer is adapted in duration and intensity, so as preferably not to lead to a complete de-metallization of the layer and therefore to a pattern which would also be visible in transmission. The secure article, especially when it constitutes a card, may comprise a core structure and at least one additional layer at least partially covering the core structure, having at least one aperture, the core structure being disposed in this ajour. The additional layer may be of a polymeric material.

The secure article may comprise two additional layers on either side of the core structure, the additional layer located opposite the one having ajour receiving the safety structure also comprising an ajour. The latter may receive a patch having a pattern, in particular made by printing, visible in light transmitted through the safety structure, the openings overlapping preferably exactly.

The secure article, especially when it has two additional layers each having an aperture, may comprise two structures, each arranged in an aperture. In particular, each aperture may receive a patch on one side a semitransparent layer. The patch located on the front side can be coated on its front face by the semi-transparent layer and the patch located on the back side can be coated on its reverse side by the semi-transparent layer.

The secure article may constitute a passport, an identity card, a driving license, a playing card or interactive collectible card, a payment card or other means of payment, a gift certificate or a gift certificate, a voucher, an access card, a secure label, a transport card, a loyalty card, a service card or a subscription card, or a specific payment method such as a token or a wafer used in particular in the casinos.

The secure article may comprise a core structure and on both sides of the core structure two semitransparent layers, preferably overlapping at least partially, the particles of the two layers being the same or the particles being different, each of the semi-transparent layers preferably having a laser marking, the marks formed by laser being identical or different, in particular corresponding to two different views of the same object or the same person.

The core structure may carry an image overlapping at least partially with each of the semitransparent layers. The secure article may include a perforated core structure, with an aperture of the core structure, an insert carrying a semitransparent layer.

The insert may carry on one side the semi-transparent layer and on an opposite side an image superimposed at least partially on the semi-transparent layer.

In an exemplary implementation, the secure article comprises a perforated core structure, with an aperture of the core structure, an insert carrying two semitransparent layers, said particles of the pigment component of the two layers being the same or said particles being different, each of the semitransparent layers preferably having a laser marking, the marks formed by laser being identical or different, in particular corresponding to two views different from the same object or the same person. The core structure may carry an image overlapping at least partially with each of the semitransparent layers.

In the case where the secure article is a card, it can comply with ISO 7810 and/or 10373. Cards are described in ISO 7810 in general. The ISO 10373 standard contains the test methods to check the card's properties as required in ISO 7810.

The secure article or safety structure may also include one or more additional security elements. Among the additional security elements that can be integrated into an secure article or a safety structure, some are of the first level, being detectable to the naked eye, in daylight or in artificial light, without the use of a device, in particular, being visible from one side of the structure or through the window if the second layer is non-opaque. These security elements comprise, for example, colored or luminescent fibers or boards, metal boards, fully or partially printed or metallized wires.

The secure article or safety structure may also comprise other types of second level security elements, detectable with a relatively simple apparatus, such as a lamp emitting in the ultraviolet or the infrared wave range. These security elements comprise, for example, fibers, boards, strips, wires or particles. These security elements can be visible to the naked eye or not, being for example luminescent under the lighting of a lamp emitting at the wavelength of 365 nm.

Other types of security elements are of the third level and require for their detection a more sophisticated detection device. These security elements are for example capable of generating a specific signal when they are subjected, simultaneously or not, to one or more external excitation sources. The automatic detection of the signal makes it possible to authenticate, if necessary, the structure or the article. These security elements comprise for example tracers in the form of active material, particles or fibers, capable of generating a specific signal when these tracers are subjected to optronic, electrical, magnetic or electromagnetic excitation.

The article or the structure may in particular comprise as security elements, among others, depending on the case: dyes and/or luminescent pigments and/or interferential pigments and/or liquid crystal pigments, in particular in printed form, dyes and/or photochromic or thermochromic pigments, in particular in printed form, an ultraviolet (UV) absorber, especially in the form coated or mixed with the matrix of the semi-transparent layer, a light collector specific material, for example of the "waveguide" such a luminescent light collector material such as polycarbonate polymer films marketed by Bayer under the name LISA®, an interference multilayer film, a structure with variable optical effects based on interference pigments or liquid crystals, a birefringent or polarizing layer, a diffraction structure, an embossed image, means producing a "moiré effect", such an effect being able for example to reveal a pattern produced by the superimposition of two security elements inside the article, for example by bringing together lines of two elements of security, a partially reflective refractive element, a transparent lenticular grid, a lens, for example a magnifying glass, a colored filter, a flat security element of relatively small size, such as a board, visible or non-visible, in particular a luminescent board, particles or agglomerates of particles, pigments or dyes of the HI-LITE type, visible or non-visible, in particular luminescent, security fibers, in particular metallic, magnetic with soft and/or hard magnetism, or absorbing, or excitable with ultraviolet, the visible or the infrared, and in particular the near infrared (NIR), an automatically readable security having specific and measurable luminescence characteristics, for example fluorescence or phosphorescence, light absorption, for example ultraviolet, visible or infrared, Raman activity, magnetism, microinteraction waves, X-ray interaction or electrical conductivity.

One or more security elements as defined above can be integrated directly into the matrix of the semi-reflective layer when possible or the article according to the disclosure or included in one or more security elements incorporated in the article, such as for example a wire, a foil or a patch.

One or more security elements as defined above may be incorporated, in particular dispersed in bulk, in at least one of the layers of the structure according to the disclosure, in particular the support of the semi-transparent layer.

The safety structure or the article according to the disclosure may also comprise one or more so-called "tamperproof" security elements, such as, for example, reagents for chemical products, for example capable of causing a color reaction in the presence of specific chemicals, for example chemicals used by fraudsters.

The disclosure also relates to the use of the ink according to the disclosure for silkscreen printing. The UV curability of the matrix of the ink and its viscosity of about 2000 mPas predestinates the ink according to the disclosure for this type of printing. In particular, the advantages relate to the ease of handling and the high flexibility of the printing process with regard to the properties of the cured ink and the time to be afforded. Further, the ink according to the present disclosure may exhibit environmental friendly characteristics.

For the preparation of a safety structure using the ink according to the present disclosure in particular pigment components of the so called Mirage type may be used. For example, commercially available pigments from the company Toyal® Europe, are appropriate for generating safety structures due to their high goniochromatic effect. Also the UV curability of the ink provides a high throughput, flexibility and efficiency for the production of safety structure while ensuring a good reproducibility of quality of the manufactured safety structures.

The expression "comprising one" is synonymous with "containing at least one", unless the opposite is specified.

Terms such as "about", "around", "approximately", or "substantially" as used herein when referring to a measurable value such as a parameter, an amount, a temporal duration, and the like, are meant to encompass variations of ±10% or less, preferably ±5% or less, more preferably ±1% or less, and still more preferably ±0.1% or less of and from the specified value, insofar as such variations are appropriate to perform in the disclosed disclosure. It is to be understood that the value to which the modifier "about" refers is itself also specifically, and preferably, disclosed.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The present disclosure further comprises the following aspects:

1. An ink comprising a transparent matrix being UV curable and heat sealable, and at least one pigment component.

2. The ink according to aspect 1, wherein the matrix is curable in a UV wavelength window of 320 to 420 nm.
3. The ink according to aspect 1 or 2, wherein the matrix is curable by a UV radiation energy density of 200 to 300 mJ/cm2, in particular 250 mJ/cm2.
4. The ink according to one of the preceding aspects, wherein the matrix comprises polyurethane or acrylate polymers or mixtures thereof.
5. The ink according to one of the preceding aspects, wherein the pigment component comprises goniochromatic metal particles.
6. The ink according to aspect 5, wherein the particles are platelet-shaped.
7. The ink according to aspect 5 or 6, wherein the particles comprise a metal core, preferably aluminum.
8. The ink according to one of the preceding aspects, wherein the particles are oriented substantially flat within the matrix.
9. The ink according to any one of the preceding aspects, wherein the particles are present in the matrix in the form of a monolayer.
10. The ink according to any one of the preceding aspects, the average size of the particles being between 10 and 50 microns, in particular 20 microns.
11. The ink according to any one of the preceding aspects, the concentration by dry weight of the particles within the ink being between 5 and 50%, relative to the total weight of the matrix and the particles, in particular between 15 and 45%.
12. A safety structure comprising a semitransparent layer being formed at least partially by the ink according to one of the aspects 1 to 11.
13. A secure article comprising a structure according to aspect 12, in particular a security element or a secure document such as for example a passport, an identity card, a driving license, an interactive playing or collectible card, a means of payment, in particular a payment card, a bank note, a voucher, a secure label, a transport card, a loyalty card, a card of delivery, a subscription card or a specific means of payment, such as a token or a wafer, in particular used in casinos.
14. A use of the ink according to one of the aspects 1 to 11 for silkscreen printing, in particular on surfaces of polymeric materials.

The invention claimed is:

1. An ink comprising a transparent matrix being UV curable and heat sealable, and at least one pigment component, wherein the ink in a UV-cured state has a peel strength in the range of about 6 to 8 N/cm, wherein adhesiveness corresponding to the peel strength is achievable by means of a further lamination step under the influence of pressure and heat so that the ink acts as a hot glue.

2. The ink according to claim 1, wherein the matrix is curable in a UV wavelength window of 320 to 420 nm.
3. The ink according to claim 1, wherein the matrix is curable by a UV radiation energy density of 200 to 300 mJ/cm2, in particular 250 mJ/cm2.
4. The ink according to claim 1, wherein the matrix comprises at least one of a polyurethane or an acrylate polymer.
5. The ink according to claim 1, wherein the pigment component comprises goniochromatic metal particles.
6. The ink according to claim 5, wherein the particles are platelet-shaped.
7. The ink according to claim 5, wherein the particles comprise a metal core.
8. The ink according to claim 5, wherein the particles are oriented substantially flat within the matrix.
9. The ink according to claim 5, wherein the particles are present in the matrix in the form of a monolayer.
10. The ink according to claim 5, an average size of the particles being between 10 and 50 microns.
11. The ink according to claim 5, a concentration by dry weight of the particles within the ink being between 5 and 50%, relative to a total weight of the matrix and the particles.
12. A safety structure comprising a semitransparent layer being formed at least partially by the UV-cured ink according to claim 1.
13. The safety structure according to claim 12, wherein the safety structure is a passport, an identity card, a driving license, an interactive playing or collectible card, a payment card, a bank note, a voucher, a secure label, a transport card, a loyalty card, a card of delivery, a subscription card, or a token.
14. The safety structure according to claim 12, wherein the matrix is curable in a LV wavelength window of 320 to 420 nm.
15. The safety structure according to claim 12, wherein the pigment component comprises goniochromatic metal particles.
16. The safety structure according to claim 15, wherein the particles are platelet-shaped.
17. The safety structure according to claim 15, wherein the particles comprise a metal core.
18. The safety structure according to claim 15, wherein the particles are present matrix in the form of a monolayer.
19. The safety structure according to claim 15, the average size of the particles being between 10 and 50 microns.
20. A method for using the ink according to claim 1, comprising silkscreen printing the ink on a surface of a polymeric material.

* * * * *